3,268,562
METHOD OF PHOSPHORYLATING HYDROXY STEROIDS AND PRODUCTS RESULTING THEREFROM
Robert Bruce Brownfield, Nanuet, N.Y., assignor to American Cyanamid Company, Stamford, Conn., a corporation of Maine
No Drawing. Filed Oct. 16, 1964, Ser. No. 404,509
12 Claims. (Cl. 260—397.4)

This is a continuation-in-part of application Serial No. 220,067, filed August 28, 1962, now abandoned.

This invention relates to new steroid phosphate esters. More particularly, it relates to novel 16,17-steroid phosphate esters and to the direct phosphorylation of hydroxy steroids of the pregnane series and products resulting therefrom.

In the past, it was known that the usual phosphorylating agents such as phosphoryl chloride, phosphorus trichloride, phosphorus pentachloride could be used in phosphorylating secondary alcohol groups such as the $C_3$-hydroxyl of cholesterol or the $C_{17}$-hydroxyl of testosterone. Efforts to phosphorylate the 21-hydroxyl group of steroids of the pregnane series using similar methods have been generally unsuccessful. The use of indirect methods using multiple steps have met with success, such as for example conversion of the 21-alcohol to the corresponding alkyl or aryl sulfonate, followed by conversion to the iodide and finally phosphorylation of the 21-iodinated steroid. The latter method is described in U.S. Patent No. 3,087,927.

The novel steroid phosphate esters of this invention may be illustrated by the following formula:

wherein R is selected from the group consisting of hydrogen, hydroxyl, lower alkanoyloxy, methanesulfonyloxy and chloro; R' is hydroxyl; R" is —$OPO_3H_2$; and R' and R" taken together are selected from the group consisting of $$\begin{matrix} -O & O \\ & \diagdown \| \\ & P\; O\; Na^+ \\ & \diagup \\ -O & \end{matrix}$$

and $$\begin{matrix} -O & O \\ & \diagdown \| \\ & P-OH \\ & \diagup \\ -O & \end{matrix}$$

X is selected from the group consisting of hydrogen and fluorine; Y is selected from the group consisting of hydrogen and hydroxyl and $C_1$–$C_2$ is selected from the group consisting of —$CH_2$—$CH_2$— and —CH=CH—.

The phosphate esters of hydroxy steroids of the pregnane series can be prepared directly from the hydroxy steroids by treating with β-cyanoethyl phosphate and a condensing agent and subsequently hydrolyzing the reaction product. The reaction is considered to take place in one of the following manners:

A.
$$S\overset{17\text{--OH}}{\underset{16\text{--OH}}{}} + \overset{HO}{\underset{HO}{\diagdown}}\overset{O}{\underset{\diagup}{\overset{\uparrow}{P}}}-O-CH_2CH_2CN \xrightarrow{\text{condensing agent}}$$

$$S\overset{17}{\underset{16}{}}\overset{O}{\underset{O}{\diagdown}}\overset{O}{\underset{\diagup}{\overset{\|}{P}}}ONa \xrightarrow{\text{hydrolysis}} S\overset{17\text{--OH}}{\underset{16\text{--OPO}_3H}{}}$$
(H)

B.
$$S_{21}-OH + \overset{HO}{\underset{HO}{\diagdown}}\overset{O}{\underset{\diagup}{\overset{\uparrow}{P}}}OCH_2CH_2CN \xrightarrow{\text{condensing agent}}$$

$$S_{21}-O-\overset{O}{\underset{OH}{\overset{\uparrow}{P}}}-O-CH_2CH_2CN \xrightarrow{\text{hydrolysis}}$$

$$S_{21}-O\overset{O}{\underset{OH}{\overset{\uparrow}{P}}}\overset{OH}{\diagdown} + CH_2=CHC\equiv N$$

wherein S is a steroid of the pregnane series.

The process of the present invention is useful when the starting material is a 21-hydroxy steroid of the pregnane series and it can also be used effectively when the active hydroxy groups are for example in the 16 and 17 positions to form a ring structure which can be hydrolyzed to the 16 steroid phosphate as shown hereinafter.

The novel steroid 16,17-cyclic phosphates and steroid-16-phosphates of the present invention may be prepared from such starting materials as:

$\Delta^4$-pregnene-16α-17α-diol-3,20-dione;
21-halo-$\Delta^4$-pregnene-16α,17α-diol-3,20-diones;
21-lower alkanesulfonyloxy-$\Delta^4$-pregnene-16α,17α-diol-3,20-diones;
21-lower alkanoyloxy-$\Delta^4$-pregnene-16α,17α-diol-3,20-diones;
9α-halo-$\Delta^4$-pregnene-16α,17α-diol-3,20-diones;

as well as compounds of the above groups which are further substituted by one or more of $\Delta'$, 11β-hydroxy, 1,1-keto and the like.

Other steroids found useful in the process of the present invention for the preparation of 21-phosphates are the 9α-halo-21-hydroxy steroids as 9α-halohydrocortisones;
9α-halocortisones;
9α-halocorticosterones;
9α-halo-11-dehydrocorticosterones;
9α-halo-$\Delta'^{,4}$-pregnadiene-11β,17α,21-triol-3,20-diones;
9α-halo-$\Delta'^{,4}$-pregnadiene-17α,21-diol-3,11,20-triones;
9α-halo-$\Delta'^{,4}$-pregnadiene-21-ol-3,11,20-triones;
9α-halo-2-methylhydrocortisones;
9α-halo-2-methylcortisones;
9α-halo-6α-methylhydrocortisones;
9α-halo-6α-methylcortisones;
9α-halo-6α-methyl-$\Delta'^{,4}$-pregnadiene-11β,17α,21-triol-3,20-diones; and
9α-halo-6α-methyl-$\Delta'^{,4}$-pregnadiene-17α,21-diol-3,11,20-triones;

by such 12α-halo-21-hydroxy steroids as
12α-halo-hydrocortisones;
12α-halocortisones;
12α-halocorticosterones;
12α-halo-11-dehydrocorticosterones;

12α-halo-Δ¹,⁴-pregnadiene-11β,17α,21-triol-3,20-diones; and
12α-halo-Δ¹,⁴-pregnadiene-17α-21-diol-3,11,20-triones;
by such 9,11-epoxy-21-hydroxy steroids as
9β,11β-epoxy-Δ⁴-pregnene-17α,21-diol-3,20-dione;
9β,11β-epoxy-Δ⁴-pregnene-21-ol-3,20-dione;
9β-11β-epoxy-Δ¹,⁴-pregnadiene-17α,21-diol-3,20-dione; and
9β,11β-epoxy-Δ¹,⁴-pregnadiene-21-ol-3,20-dione;
and by such other 21-hydroxy steroids as
Δ⁴-pregnene-17α,21-diol-3,20-dione (Reichstein's Compound S);
Δ⁴-pregnene-21-ol-3,20-dione;
hydrocortisone;
cortisone;
1-dehydrohydrocortisone;
1-dehydrocortisone;
2-methylhydrocortisone;
2-methylcortisone;
6α-methylhydrocortisone;
6α-methylcortisone;
9α-hydroxyhydrocortisone;
6α-methyl-Δ¹,⁴-pregnadiene-11β,17α,21-triol-3,20-diones;
6α-methyl-Δ¹,⁴-pregnadiene-17α,21-diol-3,11,20-triones;
16α,17α-lower alkylidenedioxy and
pregnadienes such as
9α-halo-11β,21-dihydroxy-16α,17α-(isopropylidenedioxy)-1,4-pregnadiene-3,20-diones;
9-halo-11β,21-dihydroxy-16α,17α-(isopropylidenedioxy)-4-pregnenes-3,20-diones;
and the like.

The preferred starting materials are those of the general formula:

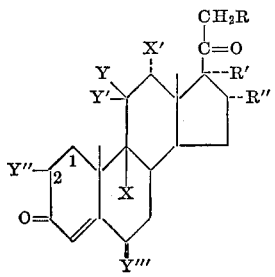

wherein the 1,2-position is saturated or double-bonded, R is hydrogen, hydroxyl, lower alkanoyloxy, methane sulfonyloxy or chloro; R' is hydroxyl; R" is hydrogen, hydroxyl or methyl; R' and R" together are

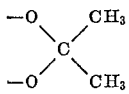

X is hydrogen, fluorine or chlorine; X' is hydrogen or α-halogen; Y is hydrogen or β-hydroxy; Y' is hydrogen; Y and Y' taken together are keto and Y" and Y''' are hydrogen or methyl.

The present process is carried out by reacting the steroid containing a reactive hydroxyl group with β-cyanoethyl phosphate and a condensing agent such as, for example, dicyclohexylcarbodiimide, di-p-tolylcarbodiimide, di-t-butylcarbodiimide and the like. Steroid hydroxy groups should be protected where phosphorylation is not desired, i.e., the 21-hydroxy where phosphorylation is desired in the 16,17 positions. The reaction is preferably carried out in a solvent, for example, pyridine, sym.-collidine, the picolines and the like. The temperature at which the reaction may be carried out will vary from 0° C. to 100° C. The reaction is completed in a period which may range from one hour to several days. The lower temperatures usually require longer periods of time. A preferred embodiment of the invention is to carry out the reaction at room temperature in pyridine for a period of from 24 to 48 hours. The ensuing operations, including isolation procedures, differ according to the nature of the desired product and are further described as follows.

*Steroid-16,17-cyclic phosphates and steroid-16-phosphates.*—Following completion of the reaction, excess condensing agent is decomposed by the addition of water and the resulting insoluble disubstituted urea may be removed by filtration. The reaction solvent is usually displaced with aqueous methanol and the product converted to the sodium salt with the aid of a sulfonic acid cation exchange resin in the sodium form. Removal of dissolved methanol under reduced pressure usually results in the precipitation of additional small quantities of the di-substituted ureas which may be removed by filtration. The substantially aqueous solution is then evaporated to dryness and the product, the steroid-16,17-cyclic sodium phosphate, is obtained by crystallization from the usual organic solvents. The corresponding acid form, the steroid-16,17-cyclic hydrogen phosphate, may be obtained from the sodium salt (in either the crude or purified form) by treatment with a sulfonic acid exchange resin in the acid form. The steroid-16,17-cyclic phosphates may be converted by acid or base hydrolysis to the steroid 16-phosphates. The hydrolysis is best carried out in dilute acidic medium at temperatures ranging from room temperature to 60° C. The time required for hydrolysis ranges from several minutes to several hours. The steroid 16-phosphate is usually insoluble in the reaction medium and may be readily separated therefrom by filtration.

*Steroid 21 phosphates.*—Following completion of the reaction, the initial reaction products are readily separated by the addition of water to decompose excess condensing agent, the disubstituted urea resulting is usually insoluble in the reaction medium. The initial phosphorylation product, a secondary phosphate ester of the starting steroid is usually not isolated as such but is hydrolyzed without further purification to the primary phosphate ester. The hydrolysis can be carried out either before or after removal of the di-substituted urea, by evaporating the water-quenched reaction mixture to a small volume, taking up the residue in aqueous alcohol and treating the suspension, or solution (if the di-substituted urea has been removed), with dilute alkali such as an alkali metal hydroxide. The hydrolysis when carried out at room temperature is usually complete in from 10 minutes to an hour although longer reaction time and higher temperature may be required depending upon the stability of the secondary and/or primary phosphate esters.

When hydrolysis is complete the solution is clarified by filtration and the steroid phosphate may be isolated by lyophilization or by precipitation for example as the free acid or as the water-insoluble zinc or piperazine salts. The steriod phosphate so obtained may be further purified by conversion to the free acid using for example ion exchange resins and finally crystallization from the usual organic solvents.

The steriod phosphoric acid esters prepared by the methods of the present invention are much more soluble in substantially aqueous solutions than the corresponding hydroxy steriods. The phosphates of, for example, triamcinolone acetonide are more stable in solution since the phosphates of the corresponding 16α,17α-dihydroxy steriods undergo D-homo-annulation forming substantially inactive compounds.

The following examples illustrate in detail the process of the present invention.

*Example 1.—Preparation of 9α-fluoro-11β,16α,17α-trihydroxy - 1,4 - pregnadiene - 3,20 - dione, 16,17-cyclic sodium phosphate*

A solution of 9α-fluoro-11β,16α,17α-trihydroxy-1,4-pregnadiene-3,20-dione (G. R. Allen et al., J. Am. Chem. Soc., 81, 4968 (1959)) (1.00 g.), pyridinium β-cyanoethyl phosphate (5.28 mmoles) and N,N'-dicyclohexylcarbodiimide (3.27 g.) in 50 ml. pyridine is stirred at room temperature for 25 hours. The solids (dicyclohexylurea) are removed by filtration and the combined filtrates and washes are evaporated under reduced pressure. The residue is taken up in methanol, and treated with an excess of a sulfonic acid ion exchange resin (Na+cycle) (batchwise, then columnwise). The column effluents and methanol washes are combined, diluted with water and concentrated to near aqueous conditions, Solids (dicyclohexylurea) are removed by filtration and the filtrate is evaporated under reduced pressure by succesive dilutions with methanol). The residue is crystallized from acetone to give the produce of the example, 1.09 g. (89.2% yield). A hydrated analytical specimen is obtained by recrystallization from acetone-methanol (trace): melting point 313°–315° C. (dec.);

$\lambda_{max.}^{MeOH}$ 238 m$\mu$ ($\epsilon$ 14,540); $\nu_{max.}^{KBr}$ 3356, 2915, 1709, 1658, 1613, 1441, 1353, 1232, 1114, 1101, 1075, 1053, 1032, 1008, 945, 895, and 833 cm.$^{-1}$; [$\alpha$]$_D^{25°}$ +80° (methanol)

*Example 2.—Preparation of 9$\alpha$ - fluoro - 11$\beta$,16$\alpha$,17$\alpha$-trihydroxy-1,4-pregnadiene-3,20-dione, 16,17-cyclic hydrogen phosphate*

9$\alpha$-fluoro - 11$\beta$,16$\alpha$,17$\alpha$ - trihydroxy - 1,4 - pregnadiene-3,20-dione, 16,17-cyclic sodium phosphate, 300 mg., is dissolved in a small volume of methanol (apparent pH 6–7) and treated with an excess of a sulfonic acid ion exchange resin (H+ cycle) (batchwise then columnwise). The acidic, steroid-containing effluents are combined and evaporated in a stream of warm air. Acetone is added and the solution is boiled on the steam bath to the point of incipient crystallization. The colorless crystalline solid is removed by filtration, washed with hot acetone and air dried (44 mg. 9$\alpha$ - fluoro - 11$\beta$,16$\alpha$,17$\alpha$ - trihydroxy-1,4-pregnadiene - 3,20 - dione, 16-dihydrogen phosphate—the compound of Example 3). Dilution of the combined acetone filtrates and washes with petroleum ether (B.P. 60–70° C.) followed by concentration on the steam bath to the point of incipient crystallization gives 206 mg. of the compound of the example as colorless crystalline solid in analytically pure form: melting point 288°–289° C. (d.);

$\lambda_{max.}^{MeOH}$ 238 m$\mu$ ($\epsilon$ 15,400); $\nu_{max.}^{KBr}$ 3425, 2941, 2740 (broad low intensity shoulder), 2326 (broad low intensity), 1724, 1667, 1582, 1449, 1361, 1263, 1181, 1057, 1005 (center of broad strong multiplet), 948, 928, 898, and 855 cm.$^{-1}$; [$\alpha$]$_D^{25°}$ +85.5° (methanol)

*Example 3.—Preparation of 9$\alpha$-fluoro-11$\beta$,16$\alpha$,17$\alpha$-trihydroxy-1,4-pregnadiene - 3,20-dione, 16 - dihydrogen phosphate*

9$\alpha$-fluoro-11$\beta$,16$\alpha$,17$\alpha$ - trihydroxy - 1,4 - pregnadiene-3,20 - dione, 16,17 - cyclic hydrogen phosphate (100 mg.) in 2.0 ml. methanol is treated with 2.0 ml. 1 N hydrochloric acid. Well defined crystalline solid begins to separate almost immediately. The solid is removed by filtration, washed well with water and recrystallized from aqueous methanol to give 75 mg. of crude 9$\alpha$-fluoro - 11$\beta$,16$\alpha$,17$\alpha$ - trihydroxy-1,4-pregnadiene - 3,20-dione, 16-dihydrogen phosphate in two crops. The analytical specimen is obtained by dissolving the crude, essentially homogeneous product in methanol, diluting with an equal volume of 1 N hydrochloric acid and, after several hours, collecting the colorless crystalline product. After washing well with water and then acetone the specimen is dried under reduced pressure; melting point 100–335° C. (slow dec. over the entire range);

$\lambda_{max.}^{MeOH}$ 238 m$\mu$ ($\epsilon$ 15,200); $\nu_{max.}^{KBr}$ 3356, 2915, 2740 (broad, low intensity shoulder), 2247 (broad, low intensity), 1689, 1650, 1567 (broad, very strong), 1179, 1027 (broad, strong), 978 (strong) and 884 cm.$^{-1}$;

[$\alpha$]$_D^{25°}$ +59° (methanol); trituration: first break pH 5.4; second break pH 9.5; pKa's 3.1, 7.9; molecular weight, 462 (theory 458).

*Example 4.—Preparation of 9$\alpha$-fluoro-11$\beta$,16$\alpha$,17$\alpha$,21-tetrahydroxy-1,4-pregnadiene-3,20-dione, 21 - acetate-16,17-cyclic sodium phosphate*

To a solution of trimacinolone-21-acetate (L. J. Leeson et al., J. Pharm. Sci., 50, 856 (1961)) (1.745 g.; 4 mmoles) in 67 ml. of pyridine is added 20 ml. of a solution of $\beta$-cyanoethyl phosphate (8 mmoles) in pyridine and 4.96 g. (24 mmoles) of N,N'-dicyclohexylcarbodiimide. The stoppered reaction mixture is stirred briefly and then allowed to stand at room temperature for 24 hours. At the end of the prescribed reaction period the reaction mixture is evaporated under reduced pressure and the residue is diluted with 20 ml. of aqueous methanol (1:1). The slurry is concentrated under reduced pressure diluted with 10 ml. of aqueous methanol, concentrated, and finally mixed well with 50 ml. of water. The insoluble dicyclohexylurea is removed by filtration. The filtrate is treated batchwise, then columnwise with an excess of a sulfonic acid cation exchange resin (Na+cycle). The column effluents and washings (water) are combined and evaporated under reduced pressure. An acetone solution of the residue is diluted with anhydrous ether until a second phase, which becomes gelatinous on standing, separates from the solution. The clear supernatant is decanted and the gelatinous residue is washed by trituration with several fresh portions of anhydrous ether. The residue is crystallized from acetone giving 1.87 g. of the compound of the example in two crops. The analytical specimen (a hydrate) is obtained by recrystallization from methanol-ether and finally from isopropanol: melting point 296° C. (dec.); [$\alpha$]$_D^{25°}$ +84.5° (MeOH);

$\lambda_{max.}^{MeOH}$ 237 m$\mu$ ($\epsilon$ 15,050); $\nu_{max.}^{KBr}$ 3436, 2941, 1730, 1664, 1623, 1239, 1117, 1053, 897, and 833 cm.$^{-1}$

*Example 5.—Preparation of 9$\alpha$-fluoro-11$\beta$,16$\alpha$,17$\alpha$,21-tetrahydroxy-1,4-pregnadiene-3,20-dione, 16 - dihydrogen phosphate*

A solution of 300 mg. of crude 9$\alpha$-fluoro-11$\beta$,16$\alpha$,17$\alpha$, 21-tetrahydroxy-1,4-pregnadiene-3,20-dione, 21 - acetate-16,17-cyclic sodium phosphate in 75 ml. of methanol, which is 0.1 N in HCl, is heated 6 hours on a hot plate adjusted so that the temperature above the liquid is about 60° C. The reaction mixture is then allowed to evaporate spontaneously and the resultant waxy residue is triturated with several portions of anhydrous ether, suspended in a small quantity of aqueous methanol, and collected by filtration to give, after air drying, 107 mg. of 9$\alpha$ - fluoro-11$\beta$,16$\alpha$,17$\alpha$,21-tetrahydroxy-1,4-pregnadiene-3,20-dione, 16-dihydrogen phosphate. An additional 47 mg. of product is obtained by concentration of the filtrate. An analytically pure sample (dihydrate) is obtained by crystallization from methanol: melting point 196° C. (dec.); [$\alpha$]$_D^{25°}$ +52 (MeOH);

$\lambda_{max.}^{MeOH}$ 239 m$\mu$ ($\epsilon$ 15,550); $\nu_{max.}^{KBr}$ 3425, 2941, 2315 (low intensity, broad), 1730, 1661, 1572, 1193, 1062, 1013, 975 and 896 cm.$^{-1}$

*Example 6.—Preparation of 9$\alpha$ - fluoro - 11$\beta$,16$\alpha$,17$\alpha$,21-tetrahydroxy - 1,4 - pregnadiene-3,20-dione, 21-(3,3-dimethylbutyrate), 16-dihydrogen phosphate*

9$\alpha$ - fluoro - 11$\beta$,16$\alpha$,17$\alpha$,21-tetrahydroxy-1,4-pregnadiene-3,20-dione, 21-(3,3-dimethylbutyrate) (L. J. Leeson et al. J. Pharm. Sci., 50,856 (1961)) 985 mg. (2.0 mmoles), pyridinium $\beta$ - cyanoethyl phosphate (4.0 mmoles) and 2.48 g. (12.0 mmoles) N,N'-dicyclohexylcarbodiimide are combined in 50 ml. of anhydrous pyridine. The reaction solution is allowed to stand at room temperature with occasional agitation. After a reaction period of 48 hours the dicyclohexylurea is removed by filtration, washed well with pyridine and the pyridine filtrates are evaporated under reduced pressure. The residue is triturated for two hours with 100 ml.

aqueous methanol (1:1), filtered and the removed solid (dicyclohexylurea) washed with aqueous-methanol (1:1). The combined aqueous-methanolic filtrates are treated batchwise and then columnwise with an excess of a sulfonic acid cation exchange resin (Na+ cycle). The solution is concentrated under reduced pressure to remove methanol whereupon an additional amount of dicyclohexylurea separates from the essentially aqueous concentrate. After removal of the solid the filtrate is evaporated under reduced pressure by successive additions of methanol. The residue (9α-fluoro-11β,16α,17α, 21 - tetrahydroxy-1,4-pregnadiene-3,20-dione, 21-(3,3-dimethylbutyrate), 16,17-cyclic sodium phosphate which could not be induced to crystallize) is dissolved in methanol, acidified with 1 N HCl and allowed to stand overnight. The heavy precipitate is collected, dissolved in methanol, treated with an equal volume of 1 N hydrochloric acid and the resulting suspension is refrigerated over the weekend. The solid is collected, retreated as above with aqueous methanol half normal in hydrochloric acid. The crystalline product is collected, washed with water and finally vacuum dried to give an analytically pure specimen of the compound of the example as a hemi-hydrate: melting point 199.5–203.5° C. (d.);

$\lambda_{max.}^{MeOH}$ 238 mμ ($\epsilon$ 14,250); $\nu_{max.}^{KBr}$ 3390, 2941, 2703 (weak shoulder), 2288 (broad, low intensity) 1727, 1664, 1608, 1232, 1131, 1058, 1020, 966 and 888 cm.$^{-1}$; $[\alpha]_D^{25°}$ +52° (MeOH)

Thin layer chromatography (silica gel G-isopropanol/ conc. NH$_4$OH/H$_2$O—7.1.2) of the starting material, the intermediate (cyclic sodium phosphate) and the product revealed relative mobilities of $R_f$ 0.85, $R_f$ 0.80 and $R_f$ 0.45, respectively.

*Example 7.—Preparation of 9α,11β-dichloro-21-hydroxy-16α,17α - isopropylidenedioxy - 1,4 - pregnadiene-3,20-dione, 21-dihydrogen phosphate*

9α,11β - dichloro - 21-hydroxy-16α,17α-isopropylidenedioxy-1,4-pregnadiene-3,20-dione, 1.88 g. (4 mmoles) and 4.96 g. (24 mmoles) of N,N'-dicyclohexylcarbodiimide are dissolved in 90 ml. of a pyridine solution containing 8 mmoles of β-cyanoethyl phosphate. The mixture is stirred at room temperature for 27 hours, treated with 10 ml. of water for 1½ hours at room temperature, and finally concentrated under reduced pressure. The concentrate is treated for four hours with sixty ml. of a water-methanol (1:2) solution containing 25 mmoles of sodium hydroxide and then adjusted to pH 5 by the addition of 6 N hydrochloric acid. After stirring for two and one-half hours the slurry is adjusted to pH 8.5 with 20% aqueous sodium hydroxide and the solids (dicyclohexylurea) are removed by filtration and washed well with water. The combined filtrates and washes are concentrated under reduced pressure to remove methanol, clarified by filtration and acidified with 6 N hydrochloric acid giving 1.50 g. (68% yield) of slightly yellow but chromatographically homogeneous 9α,11β-dichloro-21 - hydroxy - 16α,17α-isopropylidenedioxy-1,4-pregnadiene-3,20-dione, 21-dihydrogen phosphate. The product is taken up in dilute aqueous sodium hydroxide, treated with decolorizing carbon and powdered cellulose and filtered. To the filtrate is added an aqueous solution of 1 g. (11.6 mmoles) of piperazine in 15 ml. of water followed by sufficient acetic acid to attain pH 8 in the mixture. The white precipitate that forms is collected by filtration and washed thoroughly with water, methanol and acetone. An aqueous methanol suspension of the solid is treated (batchwise, then columnwise) with an excess of a sulfonic acid ion exchange resin (H+ cycle). Concentration of the total column effluents gives a pale yellow residue which after several crystallizations from acetone-water affords an analytically pure specimen (hemi-hydrate) of the compound of the example: melting point 187°–189° C. (dec.);

$\nu_{max.}^{KBr}$ 3367, 2924, 2273, (broad, low intensity), 1733, 1661, 1603, 1250, 1214, 1045, 963, 890, and 856 cm.$^{-1}$; $\lambda_{max.}^{methanol}$ 238 mμ ($\epsilon$ 15,350); $[\alpha]_D^{25°}$ +146° (MeOH)

*Example 8.—Preparation of 21-chloro-9α-fluoro-11β,16α, 17α-trihydroxy-1,4-pregnadiene-3,20-dione, 16-dihydrogen phosphate*

Following the procedure of Example 1 and using as starting material 21-chloro - 21 - deoxytriamcinolone (S. Bernstein et al., J. Org. Chem., 27, 690 (1962)) in place of 21-deoxytriamcinolone the product 21-chloro-9α-fluoro - 11β,16α,17α - trihydroxy-1,4-pregnadiene-3,20-dione, 16,17-cyclic sodium phosphate is obtained.

Hydrolysis of the product immediately above by the method described in Example 3 produces 21-chloro-9α-fluoro - 11β,16α,17α - trihydroxy - 1,4 - pregnadiene-3,20-dione, 16-dihydrogen phosphate.

*Example 9.—Preparation of 9α-fluoro-21-methanesulfonyloxy-11β,16α,17α-trihydroxy - 1,4 - pregnadiene-3,20-dione, 16-dihydrogen phosphate*

When the procedure of Example 1 is followed and triamcinolone-21-methanesulfonate (S. Bernstein et al., J. Org. Chem., 27, 690 (1962)) is substituted for 21-deoxytriamcinolone the product 21-methanesulfonyloxy-9α - fluoro-11β,16α,17α-trihydroxy-1,4-pregnadiene-3,20-dione, 16,17-cyclic sodium phosphate is obtained.

The above product when hydrolyzed by the method of Example 3 produces the product of the example.

*Example 10.—Preparation of 16α,17α-dihydroxy-4-pregnene-3,20-dione, 16-dihydrogen phosphate*

Using the procedure of Example 1 and substituting 16α,17α-dihydroxy-4-pregnene-3,20-dione (G. Cooley et al., J. Chem. Soc., 4373 (1955)) for 21-deoxytriamcinolone the product 16α,17α-dihydroxy-4-pregnene-3,20-dione, 16,17-cyclic sodium phosphate is obtained.

The above product when hydrolyzed by the method of Example 3 produces the product of the example.

*Example 11.—Preparation of 9α-fluoro-11β,21-dihydroxy-16α,17β - (isopropylidenedioxy) - 1,4 - pregnadiene-3,20-dione, 21-dihydrogen phosphate*

Barium β-cyanoethyl phosphate, 5.10 g. (13.8 mmoles), is suspended in 25 ml. of water and the stirred suspension is treated with 15 ml. of a sulfonic acid ion exchange resin (H+ form). The aqueous supernatant solution of β-cyanoethyl phosphate is filtered through a short column of fresh sulfonic acid ion exchange resin (H+ form) and to the filtrate is added 50 ml. of pyridine. The solution is evaporated to a small volume under reduced pressure, the oily residue is taken up in 25 ml. of pyridine and the evaporation is repeated. The latter operation is repeated once again. To the residue is added a near solution of 9α-fluoro-11β,21-dihydroxy-16α,17α-(isopropylidenedioxy)-1,4-pregnadiene-3,20-dione, 3.00 g. (6.90 mmoles), in 30 ml. pyridine. The mixture is evaporated to dryness under reduced pressure, the residue is taken up in 25 ml. of pyridine and the evaporation is repeated. The residue is taken up in 25 ml. of pyridine and to the resulting solution is added a solution of N,N'-dicyclohexylcarbodiimide, 8.54 g. (41.4 mmoles), in 25 ml. of pyridine. The stoppered reaction flask is allowed to stand at room temperature with occasional agitation. Colorless crystalline solid (N,N'-dicyclohexylurea) begins to separate almost immediately.

After a reaction time of 46 hours the mixture is diluted with 5 ml. of water and stirred at room temperature for 1.5 hours. The slurry is concentrated to a thick paste under reduced pressure and triturated for 1.5 hours at room temperature with 100 ml. aqueous methanolic 0.5 N sodium hydroxide solution (50 mmoles sodium hydroxide). The slurry is filtered and the solid so removed (N,N′-dicyclohexylurea) is washed well with water. The filtrate and water washes are combined and concentrated to about 200 ml. under reduced pressure. The alkaline mixture is then extracted with n-butanol (3 x 20 ml.) and methylene chloride (1 x 20 ml.) to remove non-phosphorylated steriods. The resulting aqueous solution (pH 11.2) is adjusted to pH 9.0 by treatment with a sulfonic acid ion exchange resin (H+ form). The solution is clarified by filtration and treated with an aqueous solution containing 3.0 g. (14.6 mmoles) piperazine diacetate. The colorless solid which separates immediately is separated and washed well with water then methanol and finally air dried to give 2.46 g. (4.10 mmoles, 60% yield) of 9α-fluoro-11β,21-dihydroxy-16α,17α-(isopropylidenedioxy)-1,4-pregnadiene-3,20-dione, 21-piperazinium phosphate as colorless solid; $R_f$ 0.60 [isopropanol/conc. ammonium hydroxide/water (7:1:2)].

The triamicinolone acetonide-21-piperazinium phosphate, 1.00 g. (1.67 mmoles) is suspended in methanol and to the suspension is added a sulfonic acid ion exchange resin (H+ form). The resin is removed by filtration, washed well with methanol and the combined filtrates and washes are evaporated to dryness under reduced pressure. The residue is crystallized from acetone (trace methanol)-petroleum ether (boiling point 60–70° C.) giving 600 mg. (1.17 mmoles, 70% yield) of colorless solid, melting point 215° dec., uncorr.). Several recrystallizations from the same solvent mixture gives an analytical specimen of 9α-fluoro-11β,21-dihydroxy-16α,17α-(isopropylidenedioxy)-1,4-pregnadiene-3,20-dione, 21-dihydrogen phosphate, melting point 217°–219° C. (dec., Kofler hot stage, corr.); $[\alpha]_D^{25}$ +99°±4.9° (c=1.018, methanol, 1 dm.);

$\lambda_{max.}^{MeOH}$ 239 mμ (ϵ15,050); $\nu_{max.}^{KBr}$ 3600, 2985, 1745, 1668, 1600, 1255, 1065, 975, 899 and 862 cm.$^{-1}$ $R_f$ 0.60 [isopropanol/conc. ammonium hydroxide/water (7:12)] pKa 2.95 and 6.57.

*Example 12.—Preparation of 11β,17α,21-trihydroxy-4-pregene-3,20-dione, 21-piperazinium phosphate*

To 15 ml. of a solution of β-cyanoethyl phosphate (2 mmoles) in pyridine (prepared from barium β-cyanoethyl phosphate as described in Example 11) is added 11β,17α,21-trihydroxy-4-pregnene-3,20-dione, 362.5 mg. (1 mmole) and a solution of dicyclohexylcarbodiimide, 1.65 g. (8 mmoles), in 20 ml. of pyridine. The stoppered reaction flask is allowed to stand at room temperature for 24 hours with occasional agitation. Colorless crystalline solid (N,N′-dicyclohexylurea) begins to separate almost immediately. The reaction mixture is then diluted with 5 ml. of water, kept at 5° C. for two days, and evaporated to dryness under reduced pressure. The residue is suspended in 20 ml. of aqueous methanol (1:1) and diluted with 8 ml. of a 5% aqueous solution of sodium hydroxide (10 mmoles sodium hydroxide). After one hour, with occasional agitation, the alkaline mixture is adjusted to pH 4 with dilute hydrochloric acid. After the solid (N,N′-dicyclohexylurea) is removed by filtration, the filtrate is adjusted to pH 9 with aqueous sodium hydroxide solution and is then treated with an aqueous solution of 400 mg. of piperazine diacetate. The colorless solid which separates is collected, washed well with water and methanol, suspended in 20 ml. of aqueous methanol (1:1) and treated with sulfonic acid ion exchange resin (H+ form). The resin is removed by filtration and the filtrate is adjusted to pH 9 with concentrated aqueous sodium hydroxide solution. The alkaline solution is treated with an aqueous solution of 400 mg. of piperazine diacetate and the solid which forms is collected, washed with water and methanol, and air dried. The product is further purified by reconversion to 11β,17α,21-trihydroxy-4-pregnene-3,20-dione, 21-dihydrogen phosphate and reprecipitation as the piperazinium salt, in the manner just described, to give 240 mg. of 18β,17α,21-trihydroxy-4-pregnene-3,20-dione, 21-piperazinium phosphate, melting point 241–245° C. (dec., uncorr.), $R_f$ 0.55 [isopropanol/conc. ammonium hydroxide/water; (7:1:2)]. $R_f$ value is identical with that of a sample of authentic hydrocortisone phosphate prepared by an alternate method.

*Example 13.—Preparation of 9α-fluoro-11β,17α,21-trihydroxy-16α-methyl-1,4-pregnadiene-3,20-dione, 21-piperazinium phosphate*

To 15 ml. of a solution of β-cyanoethyl phosphate (2 mmoles) in pyridine (prepared from barium β-cyanoethyl phosphate as described in Example 11) is added 9α-fluoro-11β,17α,21-trihydroxy-16α-methyl-1,4-pregnadiene-3,20-dione, 392.5 mg. (1 mmole), and a solution of dicyclohexylcarbodiimide, 1.65 g. (8 mmoles), in 20 ml. of pyridine. The stoppered reaction flask is allowed to stand at room temperature for 24 hours with occasional agitation. Colorless crystalline solid (N,N′-dicyclohexylurea) begins to separate almost immediately. The reaction mixture is then diluted with 5 ml. of water, kept at 5° C. for two days and evaporated to dryness under reduced pressure. The residue is suspended in 20 ml. of aqueous methanol (1:1) and diluted with 8 ml. of a 5% aqueous solution of sodium hydroxide (10 mmoles sodium hydroxide). After one hour, with occasional agitation, the alkaline mixture is adjusted to pH 4 with dilute hydrochloric acid. After the solid (N,N′-dicyclohexylurea) is removed by filtration, the filtrate is adjusted to pH 9 with aqueous sodium hydroxide solution and is then treated with an aqueous solution of 300 mg. of piperazine diacetate. The colorless solid which separates is collected, washed well with water and methanol, suspended in 20 ml. of aqueous methanol (1:1), and treated with sulfonic acid ion exchange resin (H+ form). The resin is removed by filtration and the filtrate is adjusted to pH 9 with concentrated aqueous sodium hydroxide solution. The alkaline solution is treated with an aqueous solution of 400 mg. of piperazine diacetate and the solid which forms is collected, washed with water, methanol and acetone, and air dried. The product is further purified by reconversion to 9α-fluoro-11β,17α,21-trihydroxy-16α-methyl-1,4-pregnadiene-3,20-dione, 21-dihydrogen phosphate and reprecipitation as the piperazinium salt, in the manner just described to give 250 mg. of 9α-fluoro-11β,17α,21-trihydroxy-16α-methyl-1,4-pregnadiene-3,20-dione, 21-piperazinium phosphate, melting point 275° C. (dec., uncorr.); $R_f$ 0.60 [isopropanol/conc. ammonium hydroxide/water (7:1:2)]. $R_f$ value is identical with that of a sample of authentic dexamethasone phosphate prepared by an alternate method.

*Example 14.—Preparation of 11β,17α,21-trihydroxy-1,4-pregnadiene-3,20-dione, 21-dihydrogen phosphate*

A pyridine solution of 11β,17α,21-trihydroxy-1,4-pregnadiene-3,20-dione, (1.0 mmole) and β-cyanoethyl phosphate (2.0 mmole) is combined with a pyridine solution of N,N′-dicyclohexylcarbodiimide (8.0 mmoles) [total volume 35 ml.] and the reaction mixture is allowed to stand at room temperature for 24 hours. Water, 5.0 ml., is added and the mixture is stored at 5° C. for two days. The mixture is evaporated to dryness under reduced pressure, the residue is suspended in 20 ml. of aqueous methanol (1:1) and the resulting suspension is treated with 8.0 ml. 5% aqueous sodium hydroxide solution (10.0 mmoles). After one hour at room temperature the suspended dicyclohexylurea is removed by filtration. Paper chromatographic examination of the filtrate indicates the presence of a single steroid, the mobility of which, $R_f$ 0.53 [isopropanol/conc. ammonium hydroxide/water (7:1:2)], is identical with that of authentic 11β,17α,21-trihydroxy-1,4-pregnadiene-3,20-dione, 21-dihydrogen phosphate.

*Example 15. — Preparation of 9α-fluoro-11β-hydroxy-17αβ-dihydrogen phosphoryloxymethyl - 16α,17αα-isopropylidenedioxy-1,4-D-homoandrostadiene-3,17-dione*

A pyridine solution of 9α-fluoro-11β-hydroxy17αβ-hydroxymethyl-16α,17αα-isopropylidenedioxy-1,4-D-homoandrostadiene-3,17-dione (0.25 mmole) and β-cyanoethyl phosphate (0.5 mmole) is combined with a pyridine solution of N,N'-dicyclohexylcarbodiimide (2 mmoles) [total volume 8.75 ml.] and the reaction mixture is allowed to stand at room temperature for 24 hours. Water, 1.25 ml., is added and the mixture is evaporated to dryness under reduced pressure. The residue is suspended in 5 ml. of aqueous methanol (1:1) and the resulting suspension is treated with 2 ml. of 5% aqueous sodium hydroxide solution (2.5 mmoles sodium hydroxide). After one hour at room temperature, the suspended dicyclohexylurea is removed by filtration. Paper chromatographic examination of the filtrate indicates the presence of a single steroid component $R_f$ 0.57 [isopropanol/conc. ammonium hydroxide/water (7:1:2)]. The $R_f$ is identical with that of an authentic specimen of 9α-fluoro-11β-hydroxy-17αβ-dihydrogen phosphoryloxymethyl-16α,17αα-isopropylidenedioxy-1,4-D-homoandrostadiene-3,17-dione prepared by an alternate method.

*Example 16.—Triamcinolone acetonide phosphate parenteral solution, 20 mg./cc.*

| | Percent w./v. |
|---|---|
| Triamcinolone acetonide phosphate | [1] 2.0 |
| Sodium hydroxide 0.1 N | Q.s. |
| Niacinamide | 2.0 |
| Disodium sequestrene | 0.05 |
| Sodium sulfite | 0.2 |
| Monothioglycerol | 0.2 |
| Sodium dihydrogen phosphate H₂O | 0.046 |
| Disodium phosphate | 0.9 |
| Phenol crystals | 0.5 |
| Water for injection q.s. ad | 100.0 | pH adjusted to 8.
Sterilize and place in sealed vials.

[1] 5% excess.

*Example 17.—0.1% triamcinolone acetonide phosphate topical cream*

| | Percent w./w. |
|---|---|
| Triamcinolone acetonide phosphate | [1] 0.1 |
| Triethanolamine | Q.s. |
| Arlacel 161 | 2.78 |
| Tween 80, USP | 4.0 |
| Robane | 2.0 |
| Spermaceti | 11.0 |
| Stearyl alcohol | 11.0 |
| Methyl paraben | 0.16 |
| Propyl paraben | 0.04 |
| Sorbitol solution (70%) | 5.0 |
| Distilled water q.s. ad | 100.0 | pH adjusted to 8.0.
Dispense in tubes or jars.

[1] 5% excess.

I claim:
1. A steroid of the formula:

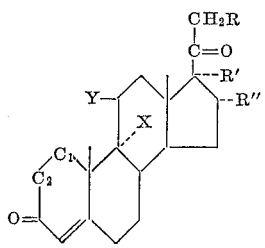

wherein R is selected from the group consisting of hydrogen, hydroxyl, lower alkanoyloxy, methanesulfonyloxy and chloro; R' is hydroxyl; R" is —OPO₃H₂; X is selected from the group consisting of hydrogen and fluorine; Y is selected from the group consisting of hydrogen and hydroxyl and $C_1$—$C_2$ is selected from the group consisting of —CH₂—CH₂— and —CH=CH—.

2. The compound 9α-fluoro-11β,16α,17α-trihydroxy-1,4-pregnadiene-3,20-dione, 16-dihydrogen phosphate.

3. The compound 9α-fluoro-11β,16α,17α,21-tetrahydroxy-1,4-pregnadiene-3,20-dione, 16-dihydrogen phosphate.

4. The compound 9α-fluoro-11β,16α,17α,21-tetrahydroxy-1,4-pregnadiene-3,20-dione, 21-(3,3-dimethylbutyrate), 16-dihydrogen phosphate.

5. The compound 21-chloro-9α-fluoro-11β,16α,17α-trihydroxy-1,4-pregnadiene-3,20-dione, 16-dihydrogen phosphate.

6. The compound 9α-fluoro-21-methanesulfonyloxy-11β,16α,17α-trihydroxy-1,4-pregnadiene - 3,20 - dione, 16-dihydrogen phosphate.

7. The compound 16α,17α-dihydroxy-4-pregnene-3,20-dione, 16-dihydrogen phosphate.

8. A method of phosphorylating a hydroxy steroid selected from the group consisting of 16α,17α-dihydroxy steroids of the pregnane series and 21-hydroxy steroids of the pregnane series which comprises contacting the said steroids with β-cyanoethyl phosphate in the presence of a condensing agent selected from the group consisting of dicyclohexylcarbodiimide, di-p-tolylcarbodiimide and di-t-butylcarbodiimide, subsequently hydrolyzing the reaction product under alkaline conditions and recovering said phosphorylated steroid of the pregnane series therefrom.

9. A method of preparing steroids having the formula:

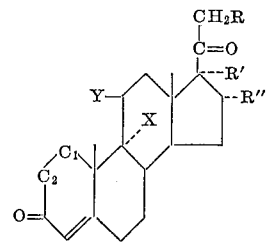

wherein R is selected from the group consisting of hydrogen, lower alkanoyloxy, methanesulfonyloxy and chloro; R' and R" taken together are selected from the group consisting of

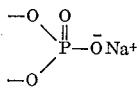

and

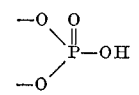

X is selected from the group consisting of hydrogen and fluorine; Y is selected from the group consisting of hydrogen and hydroxyl and $C_1$—$C_2$ is selected from the group consisting of —CH₂—CH₂— and —CH=CH— which comprises contacting the corresponding 16α,17α-dihydroxy steroid with β-cyanoethyl phosphate and a condensing agent selected from the group consisting of dicyclohexylcarbodiimide, di-p-tolylcarbodiimide and di-t-butylcarbodiimide and recovering said steroid therefrom.

10. A method of preparing steroids having the formula:

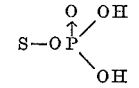

in which S is a steroid of the pregnane series which comprises reacting a C–21 hydroxyl steroid of the pregnane series with β-cyanoethyl phosphate and a condensing agent selected from the group consisting of dicyclohexylcarbodiimide, di-p-tolylcarbodiimide and di-t-butylcarbodiimide, hydrolyzing the reaction product under alkaline conditions and recovering a C–21 phosphorylated steroid of the pregnene series therefrom.

11. A method of preparing 9α-fluoro-11β,16α,17α,21-tetrahydroxy-1,4-pregnadiene-3,20-dione, 16-dihydrogen phosphate which comprises contacting 21-acetoxy-9α-fluoro-11β,16α,17α-trihydroxy-1,4-pregnadiene-3,20-dione with β-cyanoethyl phosphate in the presence of N,N'-dicyclohexylcarbodiimide, hydrolyzing the reaction product with an acidic lower alkanol and recovering said compound therefrom.

12. A method of preparing 9α-fluoro-11β,16α,17α-trihydroxy-1,4-pregnadiene-3,20-dione, 16-dihydrogen phosphate which comprises contacting 9α-fluoro-11β,16α,17α-trihydroxy-1,4-pregnadiene-3,20-dione with beta-cyanoethylphosphate in the presence of dicyclohexylcarbodiimide, hydrolyzing the reaction product with an acidic lower alkanol and recovering said compound therefrom.

References Cited by the Examiner
UNITED STATES PATENTS

| | | | |
|---|---|---|---|
| 3,009,938 | 11/1961 | Gould et al. | 260—397.45 |
| 3,045,033 | 7/1962 | Gould et al. | 260—397.45 |
| 3,069,439 | 12/1962 | Fried | 260—397.45 |

OTHER REFERENCES

Khorana, "Some Recent Developments in the Chemistry of Phosphate Esters of Biological Interest," 1961, pp. 23–25, John Wiley & Sons, Inc., New York, N.Y.

LEWIS GOTTS, *Primary Examiner.*

JOHNNIE R. BROWN, *Assistant Examiner.*